Sept. 28, 1971 T. L. RATLIFF 3,608,122
CONDUIT CLEANING APPARATUS
Filed Dec. 10, 1969 2 Sheets-Sheet 1

INVENTOR.
TROY L. RATLIFF
BY
ATTORNEYS

Sept. 28, 1971     T. L. RATLIFF     3,608,122
CONDUIT CLEANING APPARATUS
Filed Dec. 10, 1969     2 Sheets-Sheet 2
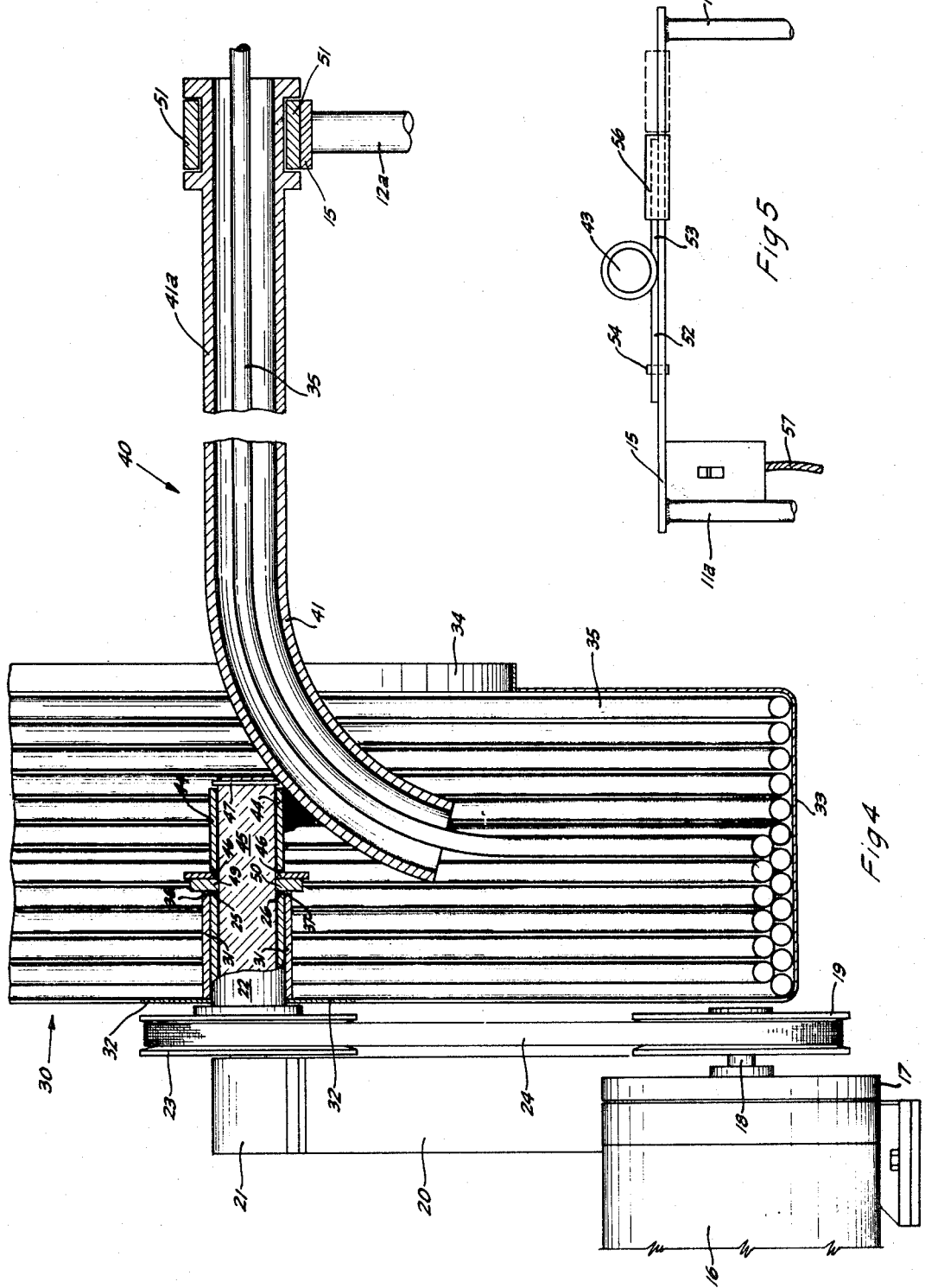
INVENTOR.
TROY L. RATLIFF
BY
*Hinderstein & Silber*
ATTORNEYS 3,608,122
CONDUIT CLEANING APPARATUS
Troy L. Ratliff, 1317 N. Bewley St.,
Santa Ana, Calif. 92703
Filed Dec. 10, 1969, Ser. No. 883,935
Int. Cl. B08b 9/02
U.S. Cl. 15—104.3SN                    12 Claims

ABSTRACT OF THE DISCLOSURE

Conduit cleaning apparatus comprising: a supporting frame; a hollow stub shaft mounted on said supporting frame; a motor and pulley for rotating the stub shaft about its longitudinal axis; a reel adapted for carrying cable, the reel including a cylindrical, hollow hub positionable on the stub shaft and rotatable therewith; and a guide tube, the guide tube including: a substantially straight portion which extends into the stub shaft and restrains axial movement of the reel relative to the stub shaft and which locks the hub of the reel to the stub shaft for rotation therewith; a hollow, arcuate portion for guiding the cable out of the reel, the straight portion being connected adjacent one end of the arcuate portion; and means for releasably securing the other end of the arcuate portion to the supporting frame.

BACKGROUND OF THE INVENTION

(1) Field of the invention

The present invention relates to conduit cleaning apparatus and, more particularly, to a simplified mechanism for supporting and driving a rotary, cable-carrying reel which contains a flexible cable of the type used for cleaning sewer and drain pipes.

(2) Description of the prior art

Various types of conduits, such as sewer and drain lines, often become clogged with waste materials or tree roots which grow through the joints in the lines. When this occurs, the usual procedure for unclogging the line is to open a clean-out tap at some accessible point and insert a suitable tool for removing the obstruction. Most conduit cleaning machines used for this purpose comprise a plurality of spring cutters or knives affixed to the end of a flexible cable which is fed into the conduit and rotated in order to rotate the cutters. The rotating cutters effectively cut away the obstruction in the conduit, whereupon liquid flowing through the line washes the obstruction away.

Typical conduit cleaning machines include a cage-type reel with a flexible cable wound on the inside thereof in position to be fed into and out of the line to be cleaned. The reel is operatively connected to a motor which turns the reel and cable wound therein so that the cutters wil sweep the interior of the conduit, removing any obstructions therein. Since the rotation of the reel merely turns the cable, the cable itself is generally fed into and out of the conduit by hand.

Although many types of conduit cleaning machines are presently in existence and operative, many problems are associated therewith. Most existing machines are complicated, with many moving parts. For this reason, the assembly and disassembly of the machine is generally a time-consuming process, making it infeasible to store and transport the apparatus in more than one piece. As a result, the user is forced to constantly deal with a heavy, cumbersome machine. Since these machines are most often used in the home, this presents a serious problem for the user who is often required to manipulate the machine down or up narrow staircases to the basement or other parts of the home.

The inability to rapidly assemble and disassemble the machine also prohibits the ready changing of reels. Such a feature is desirable for many reasons. For example, in one situation a reel of 50 feet may be adequate to perform a particular job, whereas in another situation, a cable length of 150 feet may be required. Since it stands to reason that the reel supporting 150 feet of cable is substantially heavier than the reel containing 50 feet of cable, it is desirable to be able to rapidly change reels to use the minimum amount of cable necessary for each situation. Furthermore, it is often necessary to clean very long lengths of conduits which are longer than the amount of cable which is stored on a single reel. In a situation such as this, it may be necessary to use many reels of cable, continually changing reels during the operation of cleaning the obstructed conduit. In such a situation, apparatus for the convenient and rapid changing of reels so as to materially shorten the time required to clean an obstructed sewer would be extremely advantageous.

In my co-pending U.S. Pat. application Ser. No. 761,921, filed Sept. 24, 1968, for Conduit Cleaning Apparatus, now U.S. Pat. No. 3,534,423, issued Oct. 20, 1970, there is disclosed a conduit cleaning machine which represents a significant step forward in the development of a light-weight, maneuverable machine having a minimum number of moving parts which may be rapidly assembled and disassembled. Furthermore, the conduit cleaning machine disclosed therein permits the convenient and rapid changing of reels in a matter of seconds so as to materially shorten the time required to clean an obstructed conduit. That conduit cleaning apparatus includes a supporting frame, a stationary hollow stub shaft mounted on the frame, a first pulley rotatably mounted on the stub shaft, the pulley including a pair of driver arms, a motor, a second pulley and a belt for driving the first pulley and driver arms, a reel adapted for carrying cable rotatably mounted on the stub shaft and rotated by the driver arms, and a guide tube which extends through the stub shaft for restraining axial movement of the reel relative to the stub shaft. The guide tube is secured to the stub shaft by a removable pin, the removal of which permits the removal of the guide tube and the removal of the cable-carrying reel.

While such conduit cleaning apparatus represents a significant improvement over prior conduit cleaning machines, it has sometimes been inconvenient to remove the pin to disassemble the machine. Typically, either a hammer must be used to knock the pin out of the guide tube or a pair of pliers must be used to pull out the pin. In addition, with that conduit cleaning apparatus, the entire weight of the reel is supported by the stationary, hollow stub shaft, making such part susceptible to breakage when the machine is mishandled.

SUMMARY OF THE INVENTION

According to the present invention, there is provided a light-weight, maneuverable conduit cleaning machine having a minimum number of moving parts which may be rapidly assembled and disassembled. With the present conduit cleaning apparatus, assembly and disassembly may be achieved entirely by hand, without the aid of any tools such as a hammer or a pair of pliers. In addition, with the present conduit cleaning apparatus, the guide tube is supported at two points, minimizing the possibility of breakage thereof. As with my prior conduit cleaning apparatus, the present machine permits the convenient and rapid changing of reels in a matter of seconds, so as to materially shorten the time required to clean an obstructed conduit.

Briefly, the present invention consists of a portable frame, which supports a motor which drives a first pulley via a reduction gear box. A second pulley is mounted on a rotatable hollow stub shaft mounted on the supporting frame, the second pulley and the stub shaft being driven by the first pulley via a flexible belt. A rotary cage-type reel includes a hollow hub which is positionable over the stubshaft. The stub shaft and hub include radial slots which are aligned when the hub is positioned over the stubshaft. A guide tube includes a substantially straight portion which extends into the stub shaft. A disc-shaped flange around the straight portion of the guide tube prevents removal of the hub from the stub shaft. The flange supports a pair of radially extending driver pins which fit into the slots in the stub shaft and the hub, so that the hub is forced to rotate with the stub shaft. The straight portion of the guide tube is rotatably connected to one end of a hollow, arcuate portion which guides the cable out of the reel. The other end of the arcuate portion of the guide tube includes a pair of flat, elongated arms which are releasably secured to the supporting frame.

It is, therefore, an object of the present invention to provide a novel conduit cleaning apparatus.

It is a further object of the present invention to provide a conduit cleaning apparatus which has a minimum number of moving parts.

It is a still further object of the present invention to provide a conduit cleaning machine which may be rapidly assembled and disassembled entirely by hand for storage and changing of reels.

It is another object of the present invention to provide a conduit cleaning machine which may be disassembled in a matter of seconds simply by the movement of a sliding member.

Still other objects, features and attendant advantages of the present invention will become apparent to those skilled in the art from a reading of the following detailed description of the preferred embodiment constructed in accordance therewith, taken in conjunction with the accompanying drawings wherein like numerals designate like parts in the several figures and wherein:

BRIEF DESCRIPTION OF THE DRAWINGS

FIG. 4 is a view, partly in section, of the assembled conduit cleaning apparatus showing the relationship of the components of FIGS. 1-3; and FIG. 5 is a front elevation view of the assembled conduit cleaning apparatus of FIGS. 1-4 showing the locking mechanism.

DESCRIPTION OF THE PREFERRED EMBODIMENT

Figure 1:
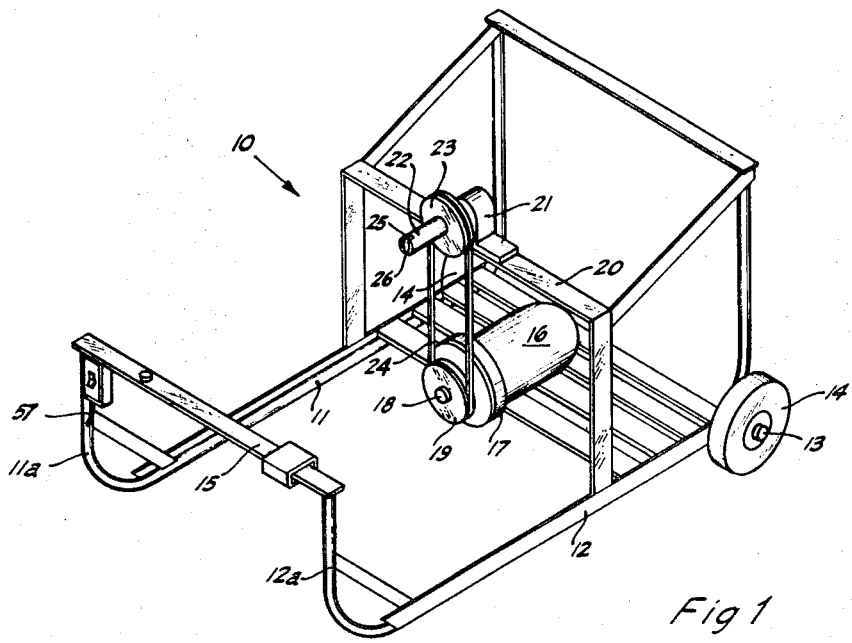
FIG. 1 is a perspective view of a portion of the present conduit cleaning apparatus showing the portable support frame, the motor, and the remaining drive apparatus.

Referring now to the drawings and, more particularly, to FIGS. 1 and 4 thereof, the present conduit cleaning apparatus comprises a portable support frame, generally designated 10, having a pair of parallel legs 11 and 12 which provide a stable support for frame 10. An axle 13 extends between legs 11 and 12 at one end thereof and supports a pair of wheels 14 so that the present apparatus may be readily rolled from one location to another. The other ends of legs 11 and 12 curve upwardly at 11a and 12a, respectively, through an angle of 90° and terminate in a flat, elongated bar 15 whose function will be explained more fully hereinafter.

Frame 10 supports a motor 16 which drives, through a gear box 17 and a shaft 18, a first pulley 19. Frame 10 further includes a substantially U-shaped support member 20 which extends from legs 11 and 12 over motor 16 and pulley 19. Member 20 supports a bearing 21 which rotatably supports one end of a hollow stub shaft 22, the other end of which extends outwardly from the front of bearing 21 for reasons which will become clear hereinafter. The other end of stub shaft 22 has a pair of radial slots 25 and 26 therein which, according to a preferred embodiment, are spaced by 180° around the axis of stub shaft 22. However, it will be apparent to those skilled in the art, that stub shaft 22 can have any number of slots having any angular orientation. Secured to stub shaft 22 so as to be rotatable therewith is a second pulley 23 which is driven by pulley 19 via a flexible belt 24.

Figure 2:
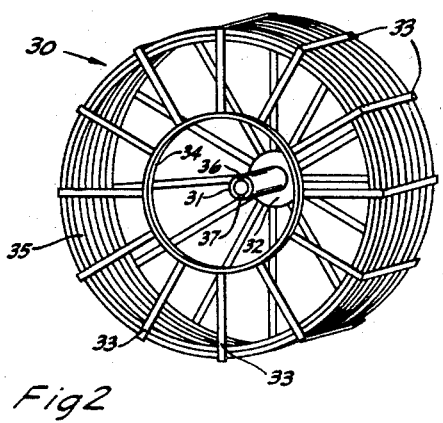
FIG. 2 is a perspective view of a rotary, cable-carrying, storage reel for use with the drive apparatus of FIG. 1.

Referring now to FIGS. 2 and 4, the present conduit cleaning apparatus also includes a rotary, cable-carrying, storage reel, generally designated 30. Reel 30 includes a hollow hub 31, the inside diameter of which is slightly greater than the outside diameter of stub shaft 22. Extending radially from one end of hub 31 is a rim 32 which supports one end of a plurality of radially extending spokes 33. Spokes 33 are substantially U-shaped members which terminate at their other ends in a ring 34 to form an open-sided cage-type structure for supporting a flexible cable 35. The other end of hub 31 has first and second slots 36 and 37 therein, which have the same dimensions and the same angular orientation as slots 25 and 26 in stub shaft 22.

Figure 3:
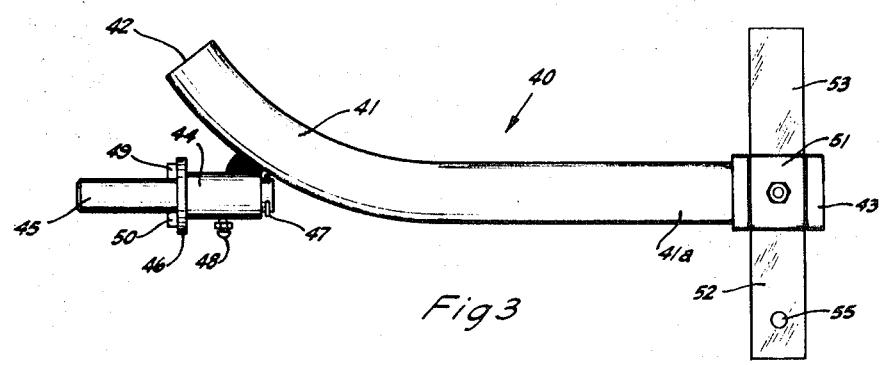
FIG. 3 is an elevation view of a guide tube for use with the apparatus of FIGS. 1 and 2.

Referring now to FIGS. 3 and 4, the present conduit cleaning apparatus also includes a guide tube, generally designated 40. Guide tube 40 includes a hollow arcuate section 41 having a guide tube mouth 42 at one end thereof and a guide tube exit 43 at the other end thereof for conducting cable 35 from reel 30, as will appear more fully hereinafter. Although section 41 is generally arcuate, it includes a straight portion 41a adjacent exit 43.

Supported near mouth 42 of guide tube 40, co-axially with straight portion 41a of section 41, is a cylindrical sleeve 44 which rotatably supports a shaft 45, the outside diameter of which is slightly less than the inside diameter of stub shaft 22. Shaft 45 has a disc-shaped flange 46 extending around the entire circumference thereof at a point intermediate the ends thereof, flange 46 being in contact with one end of sleeve 44. The end of shaft 45 on the other side of sleeve 44 may include a lock ring 47 whereby the combination of flange 46 and lock ring 47 prevent axial motion of shaft 45 relative to sleeve 44. A grease fitting 48 may be provided to grease the area between the inner surface of sleeve 44 and the outer surface of shaft 45 so that shaft 45 may rotate freely relative to sleeve 44.

Extending radially from opposite directions of shaft 45 and in contact with flange 46 is a pair of drive pins 49 and 50 whose lateral dimensions are slightly less than the dimensions of slots 25, 26, 36 and 37 in stub shaft 22 and hub 31, respectively, and whose lenghts are great enough to traverse the distance through stub shaft 22 and hub 31.

Referring now to FIGS. 3 and 5, exit end 43 of guide tube 40 is rotatably supported by a bearing 51 which is connected to first and second substantially flat, elongated arms 52 and 53 which have approximately the same width as bar 15 on support frame 10. With such a configuration, arcuate section 41 of guide tube 40 may rotate relative to shaft 45 and arms 52 and 53.

Referring now primarily to FIG. 4, but also generally to FIGS. 1-3 and 5, motor 16, gear box 17, support member 20 and bearing 21 are all fixedly mounted on portable support frame 10. Bearing 21 rotatably supports hollow stub shaft 22, one end of which is flush with the back of bearing 21 and the other end of which extends outwardly from the front thereof. Pulley 23, which is fixidly secured to stub shaft 22, is adapted to rotate stub shaft 22 through the intermediary of motor 16, pulley 19 and flexible belt 24.

Hub 31 of rotary, cable-carrying, storage reel 30 is adapted to fit over stub shaft 22. The length of hub 31 is approximately equal to the length of that portion of stub shaft 22 which extends outwardly from pulley 23. Therefore, with hub 31 positioned on stub shaft 22, slots 36 and 37 in hub 31 may be aligned with slots 25 and 26, respectively, in stub shaft 22.

Shaft 45 of guide tube 40 is adapted to extend into the hollow portion of stub shaft 22. With shaft 45 so positioned, drive pins 49 and 50 on shaft 45 extends into slots 25 and 26, and 36 and 37, respectively, in stub shaft 22 and hub 31. In this manner, stub shaft 22 rotates shaft 45 therewith, drive pins 49 and 50 rotating hub 31. As a result, the rotary motion of stub shaft 22 is imparted to reel 30.

The diameter of flange 46 is slightly greater than the diameter of hub 31. In this manner, and as shown in FIG. 4, with shaft 45 extending into stub shaft 22 and with drive pins 49 and 50 extending into slots 25, 26, 36 and 37, flange 46 prevents hub 31 from slipping off stub shaft 22.

To prevent tube 40 from being withdrawn from stub shaft 22, exit end 43 of guide tube 40 is releasably secured to bar 15 of support frame 10. As shown in FIG. 5, arms 52 and 53 are adapted to lie flat on top of bar 15. Bar 15 supports an upwardly extending pin 54 which, with arms 52 and 53 in position, thereon, extends through a hole 55 in arm 52 thereby preventing lateral movement of arm 52 relative to bar 15. Furthermore, to secure arm 53 to bar 15, bar 15 is provided with a rectangular, elongated, hollow slide member 56 which is adapted to slide between a first position, shown in solid lines in FIG. 5, surrounding arm 53 and bar 15, and a second position, shown dotted in FIG. 5, surrounding bar 15 but clear of arm 53.

The remainder of guide tube 40 operates in a conventional manner. Cable 35 is adapted to be extended into guide tube mouth 42 and to extend from guide tube exit 43 so that cable 35 may be fed axially out of the present apparatus.

In operation, the present apparatus may be conveniently stored in three parts shown in FIGS. 1–3. Thereafter, once the apparatus is positioned adjacent the conduit to be cleaned, the apparatus may be readily assembled in a rapid and efficient manner by simply positioning reel 30 onto support frame 10, stub shaft 22 extending through hub 31 with slots 25 and 36 and slots 26 and 37, respectively, aligned. The apparatus is then locked in place by extending shaft 45 of guide tube 40 into stub shaft 22 with drive pins 49 and 50 extending into slots 25, 36 and 26, 37, respectively. In this position, arms 52 and 53 are directly above bar 15. Pin 54 is extended into hole 55 in arm 52 and slide member 56 is moved to its first position as shown in solid lines in FIG. 5, thereby locking arm 53 to bar 15 and preventing removal of shaft 45 from stub shaft 22. The end of cable 35 is then fed into guide tube mouth 42 where it exits from guide tube exit 43. After a set of cutter blades are attached to the end of cable 35 and cable 35 is inserted into the conduit to be cleaned, motor 16 may be started by connecting an electrical line 57 to any suitable source of A.C. voltage. Motor 16 drives pulley 19 via gear box 17 whereupon pulley 19 drives pulley 23 and stub shaft 22 via flexible belt 24. Stub shaft 22 drives pins 49 and 50 and shaft 45 which drive hub 31 of storage reel 30.

As long as cable 35 is not pulled out of or pushed into cage 30, the rotation of cage 30 forces arcuate section 41 of guide tube 40 to rotate therewith, thereby rotating cable 35. However, it should be noted that arcuate section 41 of guide tube 40 is freely rotatable relative to shaft 45 and bearing 51. Therefore, arcuate section 41 of guide tube 40 is free to rotate independently of cage 30. Thus, while cable 35 is being withdrawn from reel 30, arcuate section 41 of guide tube 40 rotates faster than reel 30. Conversely, when cable 35 is being fed back into reel 30, arcuate section 41 of guide tube 40 rotates slower than reel 30, or may be stationary, or even rotate in the opposite direction, depending upon the speed of rotation of reel 30 and the speed at which cable 35 is fed into cage 30.

When it is desired to change reels, slide member 56 is moved until it no longer contacts arm 53. This permits elevation of arms 52 and 53 to free arm 52 from pin 54. With arms 52 and 53 freed from bar 15, guide tube 40 may be pulled out of stub shaft 22. This simple action completely frees cage 30 and permits it to be removed from stub shaft 22. Another reel may then be placed with its hub 31 on stub shaft 22 whereupon shaft 45 of guide tube 40 is extended into stub shaft 22 and arms 52 and 53 are again secured to bar 15 by the simple expedient of manipulating slide member 56 by hand.

It can therefore be seen that in accordance with the present invention there is provided a simple and efficient apparatus for cleaning sewer and drain lines and other conduits. The present apparatus serves to completely replace the complicated structures of prior art conduit cleaning machines. Not only is the present machine simpler and more troublefree in construction, but it has the added advantage of permitting the rapid assembly and disassembly of the machine for changing reels or for storage and transportation. In addition, the machine may be entirely assembled and disassembled by hand without requiring the use of any other equipment.

While the invention has been described with respect to the preferred physical embodiment constructed in accordance therewith, it will be apparent to those skilled in the art that various modifications and improvements may be made without departing from the scope and spirit of the invention.

I claim:

1. Conduit cleaning apparatus comprising:
   a supporting frame;
   a hollow, stub shaft mounted on said supporting frame;
   means for rotating said stub shaft about its axis;
   a reel adapted for carrying cable, said reel including a cylindrical, hollow hub positionable on said stub shaft;
   a guide tube comprising:
      a substantially straight portion extending into said stud shaft and including means for restraining axial movement of said reel relative to said stub shaft and means for driving said reel with said stub shaft; and
      a hollow, arcuate portion for guiding said cable out of said reel, said straight portion being rotatably connected adjacent one end of said arcuate portion; and
   means for releasably securing the other end of said arcuate portion to said supporting frame.

2. Conduit cleaning apparatus according to claim 1 wherein said means for rotating said stub shaft about its axis comprises:
   a pulley fixedly secured to said stub shaft; and
   means for rotating said pulley.

3. Conduit cleaning apparatus according to claim 2 wherein said means for rotating said pulley comprises:
   a motor mounted on said supporting frame;
   a second pulley;
   means including a gear box for connecting said motor to said second pulley whereby said motor drives said second pulley; and
   a flexible belt connecting said first-mentioned pulley and said second pulley.

4. Conduit cleaning apparatus according to claim 1 wherein said guide tube further comprises:
   a cylindrical sleeve fixedly secured to said arcuate portion adjacent said one end thereof, said substantially straight portion consisting of an elongated cylindrical shaft extending through said sleeve, said sleeve rotatably supporting said shaft.

5. Conduit cleaning apparatus according to claim 4 wherein said means for restraining axial movement of said reel comprises:
   a disc-shaped flange extending around the circumference of said elongated shaft at a point intermediate the ends thereof, said flange being in contact with one end of said sleeve.

6. Conduit cleaning apparatus according to claim 5 wherein said guide tube further comprises:
a lock ring extending around said elongated shaft at one end thereof adjacent the other end of said sleeve, said lock ring restraining axial movement of said elongated shaft relative to said sleeve.

7. Conduit cleaning apparatus according to claim 5 wherein said stub shaft has at least one radial slot therein at one end thereof, wherein said hub has at least one radial slot therein at one end thereof, said slots in said stub shaft and said hub being aligned when said hub is positioned on said stub shaft, and wherein said means for driving said reel comprises:
at least one drive pin extending radially from said elongated shaft in contact with said flange, said drive pin extending into said slots in said stub shaft and said hub when said elongated shaft is extended into said stub shaft.

8. Conduit cleaning apparatus according to claim 4 wherein said stub shaft has at least one radial slot therein at one end thereof, wherein said hub has at least one radial slot therein at one end thereof, said slots in said stub shaft and said hub being aligned when said hub is positioned on said stub shaft, and wherein said means for driving said reel comprises:
at least one drive pin extending radially from said elongated shaft, said drive pin extending into said slots in said stub shaft and said hub when said elongated shaft is extended into said stub shaft.

9. Conduit cleaning apparatus according to claim 1 wherein said supporting frame includes a flat, elongated bar rigidly secured thereto and wherein said guide tube further comprises:
first and second substantially flat, elongated arms; and
bearing means for rotatably supporting said arms adjacent said other end of said arcuate portion of said guide tube, said arms being positioned on top of said bar and in contact therewith when said straight portion of said guide tube is extended into said stub shaft; and wherein said means for releasably securing said other end of said arcuate portion of said guide tube to said supporting frame comprises:
a generally rectangular, elongated, hollow slide member positioned around said bar, said slide member being operative to slide between a first position surrounding one of said arms and said bar and a second position surrounding only said bar.

10. Conduit cleaning apparatus according to claim 9 wherein the other of said arms has a hole extending therethrough, and wherein said means for releasably securing said other end of said arcuate portion of said guide tube to said supporting frame further comprises:
a pin extending from said bar, said pin extending through said hole in said other of said arms when said arms are in contact with said bar.

11. Conduit cleaning apparatus comprising:
a supporting frame;
a reel adapted for carrying cable;
means for rotatably supporting said reel adjacent one end of said frame, said frame including a flat, elongated bar rigidly secured thereto adjacent the other end thereof;
a guide tube for guiding said cable out of said reel, said guide tube including:
means at one end thereof for restraining axial movement of said reel relative to said frame;
first and second substantially flat, elongated arms; and
bearing means for rotatably supporting said arms adjacent the other end of said guide tube, said arms being positionable on top of said elongated bar and in contact therewith; and
means for releasably securing said other end of said guide tube to said other end of said frame, said means comprising:
a generally rectangular, elongated, hollow slide member positioned around said bar, said slide member being operative to slide between a first position surrounding one of said arms and said bar and a second position surrounding only said bar.

12. Conduit cleaning apparatus according to claim 11 wherein the other of said arms has a hole extending therethrough, and wherein said means for releasably securing said guide tube to said supporting frame further comprises:
a pin extending from said bar, said pin extending through said hole in said other of said arms when said arms are in contact with said bar.

References Cited
UNITED STATES PATENTS

| | | | |
|---|---|---|---|
| 2,926,372 | 3/1960 | O'Brien | 15—104.3SN |
| 2,953,799 | 9/1960 | Arnold | 15—104.3SN |
| 3,095,592 | 7/1963 | Hunt | 15—104.3SN |
| 3,298,051 | 1/1967 | Ratliff | 15—104.3SN |

EDWARD L. ROBERTS, Primary Examiner